United States Patent [19]

Masuda

[11] Patent Number: 5,081,917
[45] Date of Patent: Jan. 21, 1992

[54] APPARATUS FOR AUTOMATICALLY PRODUCING CONFECTIONERY CAKES OR THE LIKE

[75] Inventor: Fumihiko Masuda, Saitama, Japan

[73] Assignee: Shin Nihon Machine Mfg. Co., Ltd., Saitama, Japan

[21] Appl. No.: 446,039

[22] Filed: Dec. 5, 1989

[30] Foreign Application Priority Data

Oct. 11, 1989 [JP] Japan .................................. 1-264621

[51] Int. Cl.⁵ ........................ A21C 5/00; A21C 11/00; A23P 1/00
[52] U.S. Cl. .................................. 99/450.2; 99/450.1; 99/450.6; 99/450.7; 99/492; 99/494; 118/14; 118/23; 198/465.3
[58] Field of Search ...................... 99/443 C, 477–479, 99/450.1, 450.2, 450.6, 450.7, 494, 492; 198/465.3; 426/503, 516; 118/14, 16, 23; 425/131.1, 133.1, 151

[56] References Cited

U.S. PATENT DOCUMENTS

| | | | |
|---|---|---|---|
| 2,844,241 | 7/1958 | King | 198/465.3 |
| 3,245,360 | 4/1966 | Evanson et al. | 99/450.2 |
| 3,249,133 | 5/1966 | Goodman et al. | 99/450.7 |
| 3,850,088 | 11/1974 | Tobey et al. | 99/450.7 |
| 4,256,221 | 3/1981 | Lain | 198/465.3 |
| 4,651,635 | 3/1987 | Ally | 99/450.6 |
| 4,741,916 | 5/1988 | Heidel et al. | 426/503 |

FOREIGN PATENT DOCUMENTS 61-166344 7/1986 Japan .
61-166346 7/1986 Japan .

Primary Examiner—Timothy F. Simone
Attorney, Agent, or Firm—Sughrue, Mion, Zinn, Macpeak & Seas

[57] ABSTRACT

This invention is related to an apparatus for automatically producing confectionery cakes or the like, comprising at least one station for processing or shaping cakes or the like set on an upper plate, drive and guide pulleys rotatably provided underneath said station or stations, a pair of parallel endless conveyor belts passed round said drive and guide pulleys, and holders provided at a predetermined pitch on said conveyor belts for keeping upper plates on said conveyor belts, said upper plates each being displaced in the lengthwise direction of said conveyor belts and widthwise direction perpendicular to said lengthwise direction for processing shaping cakes or the like.

13 Claims, 11 Drawing Sheets

APPARATUS FOR AUTOMATICALLY PRODUCING CONFECTIONERY CAKES OR THE LIKE

BACKGROUND OF THE INVENTION

With recent re-organization and enlargement of distributive systems and development of food processing techniques, almost all kinds of confectionery are automatically manufactured by mass production and supplied through re-organized distributive systems.

In shortcakes and decoration cakes among the confectionery, the sponge cake is automatically mass-produced. However, the operation of decorating the sponge cake with cream or the like by setting the sponge cake on a table can be difficult to automate and therefore it is usually a manual operation.

With remarkable development of the computer technology, many techniques which have hitherto required manual operations are automated. In the field of manufacture and processing of confectionery cakes, however, it is difficult to automate operations by making use of computer techniques and develop machines, in which computer programs in use are assembled, because versatility of steps of manufacture and processes are involved. For this reason, the automation and development in this concern are greatly retarded.

More specifically, when introducing programming with computer techniques into the field concerning the computer techniques and manufacturing machines and apparatus, in which such computer programs are incorporated, it has heretofore been necessary to alter or improve the procedure of manufacture or processing to one suited for programming in advance. Without such alteration or improvement, it is very difficult to program a conventional procedure of manufacture or processing of cakes. If programming could be obtained, an apparatus of manufacture or processing which is constructed on the basis of such programming is extremely complicated in construction, and in many cases it is not suitable to implement programming. As an example, considering a procedure of preparing a bun or manju, which consists of a stuff made of wheat or rice flour and a bean-jam filling wrapped in the stuff, to incorporate computer techniques into the preparation technique the procedure should be improved such that it comprises a vessel formation step to form a vessel-like stuff of cake, a filling injection step to inject the bean-jam filling into the vessel-like stuff and a closing step to close the filling with the stuff. In a decoration cake or a shortcake, a depositer or like station for dropping cream or the like is moved over a sponge cake base to draw a pattern with the cream or the like on the cake base. A plurality of different patterns are drawn successively in super imposition on one another to complete the decoration. In order to program such a decorating procedure by making use of computer program techniques, however, it is necessary to disassemble the completed overall pattern and classify individual disassembled elements into groups each consisting of like elements in correspondence to the movement of depositer, for instance. Further, it is necessary to prepare depositers corresponding in number to the number of the groups of elements, and allow cream or the like to drop on an upper plate with the depositers held stationary while moving the upper plate at a horizontal level for the elements in the individual groups. More specifically, where a sponge cake base for a decoration cake is decorated with cream or the like by moving the upper plate at a horizontal level while holding depositers stationary, the upper plate is moved under each stationary depositer according to a predetermined program (i.e., a program which is determined according to each of the classified movements of elements). It is thus possible to supply a great quantity of cream or the like. More specifically, where depositers are moved as in the prior art, if a great quantity of cream is to be supplied, the depositers become very heavy, making their smooth movement very difficult. Further, if the upper plate is supported on a belt conveyor, after completion of decoration it can be moved and discharged by driving the conveyor belt according to an instruction from a computer unit.

The inventor earlier proposed an apparatus for automatically producing cakes or the like as disclosed in Japanese Patent Disclosure 166,344/1986. The disclosed apparatus is shown in FIGS. 1 and 2. As is shown, the apparatus has a pair of endless conveyor belts 1 and one or more depositers or like stations 2 disposed above conveyor belts 1 for dropping cream or the like to process cakes or the like for decoration. Endless conveyor belts 1 are provided with a plurality of holders 3 disposed at a pitch for holding respective upper plates 4. Under each station 2, each plate 4 is moved together with endless conveyor belts 1 in the lengthwise direction thereof (as shown by arrows Y—Y in FIG. 1) and also in the widthwise direction (as shown by arrows X—X in FIG. 2) perpendicular to the lengthwise direction to perform a decoration step corresponding to each element of a given pattern or a pressure application or other press step. Then, it is moved to a position under the next station to perform the next decoration or pressure application step, and then it is moved to a further station and so forth. The mechanism for moving the upper plates in the lengthwise direction Y—Y and widthwise direction X—X has the following construction.

Portable body 5 with casters 6 has a plurality of bases 7 extending from its front. Individual bases 7 have guide rails 8 laid on their top. Movable base 10 is supported via its casters on rails 8 such that it can be moved in X—X direction, i.e., the widthwise direction perpendicular to the lengthwise direction. Movable base has shafts each rotatably mounted in it at each end thereof. Pair drive pulleys 121 are mounted on one shaft 11 at opposite ends thereof, and a pair of guide pulleys 122 are mounted on other shaft 11 at opposite ends thereof. A pair of endless conveyor belts 1 are passed around respective drive and guide pulleys 121 and 122. Conveyor belts 1 are driven by drive pulleys 121 to run intermittently in Y—Y direction and at a unit pitch. Upper plates 4 supported on conveyor belts 1 are fed forwards under each station 2 after completion of each unit step. Each upper plate 4 carrying eventual cakes or the like set on it is stopped under each station 2. Here, it is moved in Y—Y and X—X directions with intermittent movement of conveyor belts 1 in Y—Y directions at a unit pitch and movement of movable base 10 in the X—X directions, these movements being caused according to a predetermined program. The eventual cakes or the like on each upper plate 4 are thus subjected to processing of a unit step at the pertinent station 2. Connecting rod 13 (see FIG. 2) is coupled at one end to movable base 10 and has a rack formed on its outer periphery. A pinion (not shown) provided in body 5 is in mesh with the rack, and it is rotated by a drive motor (not shown) via a drive pulley (not shown) and a belt (not shown) to move the movable base 10 in the X—X directions via connecting rod 13.

In this apparatus, however, the mechanism for moving the upper plates in the X—X directions comprises a plurality of stationary bases 7, guide rails 8 laid thereon and movable the base 10 capable of being moved along the guide rails. Therefore, the mechanism is complicated in construction. In addition, it is large in size and heavy in weight, thus greatly spoiling the portability of the apparatus. Further, movable base 10 carries drive and guide pulleys 121 and 122 and endless conveyor belts 1 passed round these drive and guide pulleys, and it is moved in the X—X directions, i.e., toward and away from the front of body 5, a space if produced, in which an operator's hand or the like is liable to be trapped, thus posing safety problems. Further, drive and guide pulleys 121 and 122 and movable base 10 are found right under plates upper 4, and they are exposed when upper plates 4 are removed. This poses a hazard of dragging in the operator, thus again posing safety problems. Further, cream or the like is liable to fall from the stations such as depositers onto movable base 10. For cleaning the inside of the apparatus contaminated by the cream or the like, it is necessary to disassemble the apparatus, take out movable base 10, shafts 11, drive pulleys 121 and connecting rod 13 for cleaning and reassemble the apparatus. Therefore, the cleaning is very time-consuming.

Further, where eventual cakes or the like set on each upper plate 4 supported on the pair of conveyor belts 1 are processed under each station 2 by moving upper plate 4 in Y—Y and X—X directions, upper plate 4 is liable to slip on conveyor belts 1 during its movement in the Y—Y and X—X directions although it is held by associated holders 3. In such a case, upper plate 4, particularly eventual cakes or the like placed on upper plate 4, may fail to follow a predetermined program even when conveyor belts 1 and movable base 10 are accurately moved in the Y—Y and X—X directions, respectively, according to the program. This means that cream or the like falling from each station 2 may fail to be deposited on a predetermined part of each eventual cake or the like on upper plate 4, that is a given pattern or shape as specified by a predetermined program may fail to be formed on the eventual cake. It is considered to provide conveyor belts 1 with a frictional character so as to prevent the slip of upper plates 4 and conveyor belts 1 relative to one another. To do so, however, leads to an increase in the mass of the conveyor belts themselves. Besides, light-weight materials such as synthetic resins and rubber cannot be used because they have considerable slidability. If metal conveyor belts which the provision of a frictional character are used, the apparatus is increased in size, which is undesired.

SUMMARY OF THE INVENTION

According to the invention, there is provided an apparatus for automatically producing confectionery cakes or the like, comprising at least one station for processing eventual cakes or the like set on an upper plate, drive and guide pulleys rotatably provided underneath said stations, a pair of parallel endless conveyor belts passed around said drive and guide pulleys, and holders provided at a predetermined pitch on said conveyor belts for keeping plates on said conveyor belts, said upper plates each being displaced in the lengthwise direction of said conveyor belts and widthwise direction perpendicular to said lengthwise direction for processing eventual cakes or the like, said apparatus further comprising a lower frame rotatably carrying said drive and guide pulleys at opposite ends, and a cover covering said lower frame, having a top surface slidably supporting the forward run of said conveyor belts and covering the return run thereof.

With this apparatus according to the invention, when upper plates supported on the endless conveyor belts are displaced relative to stationary stations in the lengthwise direction or Y—Y direction of the endless conveyor belts and widthwise direction or X—X direction perpendicular to the Y—Y direction for processing eventual cakes or the like, the forward run of the conveyor belts is slidably supported on the cover, and in this state of support the conveyor belts and upper plates can be displaced in the X—X directions. Thus, it is possible to obtain automatic and smooth processing of eventual cakes or the like.

Further, the lower frame, on which the drive system including the drive pulleys and drive motor are mounted, and also the return run of the endless conveyor belts are perfectly covered by the cover, and there is no possibility of trapping an operator's hand by these components during operation. Safety thus is greatly improved. Further, stuff or like part of cakes or cream or the like from stations falling from upper plates can be captured by the cover, thus extremely simplifying the cleaning. Further, when the movement of upper plates is programmed, a programming unit and computer can be accommodated in the cover. Satisfactory slip of the endless conveyor belts on the cover can be obtained. A ball screw mechanism can be directly coupled to the lower frame, thus permitting size and weight reduction to be attained.

Further, an elastic guide member capable of being elastically elongated and contracted in the X—X directions is provided on the outer side of one of the pair conveyor belts slidably supported on the cover, and a stationary guide member is provided on the outer side of the other conveyor belt. Upper plates are thus held by the elastic and stationary guide members, thus permitting accurate movement of the upper plates in the X—X and Y—Y directions and smooth and automatic production of cakes or the like.

Further, a slidable plate which is moved with the drive motor is provided between an end surface of the cover covering the lower frame and drive motor projecting from the lower frame.

Thus, the lower frame can be covered by the cover to provide for enhanced safety and productivity. In addition, even if the drive motor and drive pulleys are provided outside the cover, troubles in these drive components can be readily detected. Further, when an opening is formed in the cover, it can be perfectly surrounded.

BRIEF DESCRIPTION OF THE DRAWINGS

FIG. 1 is a front view showing a prior art apparatus for automatically producing confectionery cakes or the like;

DETAILED DESCRIPTION OF PREFERRED EMBODIMENT

Figure 1:
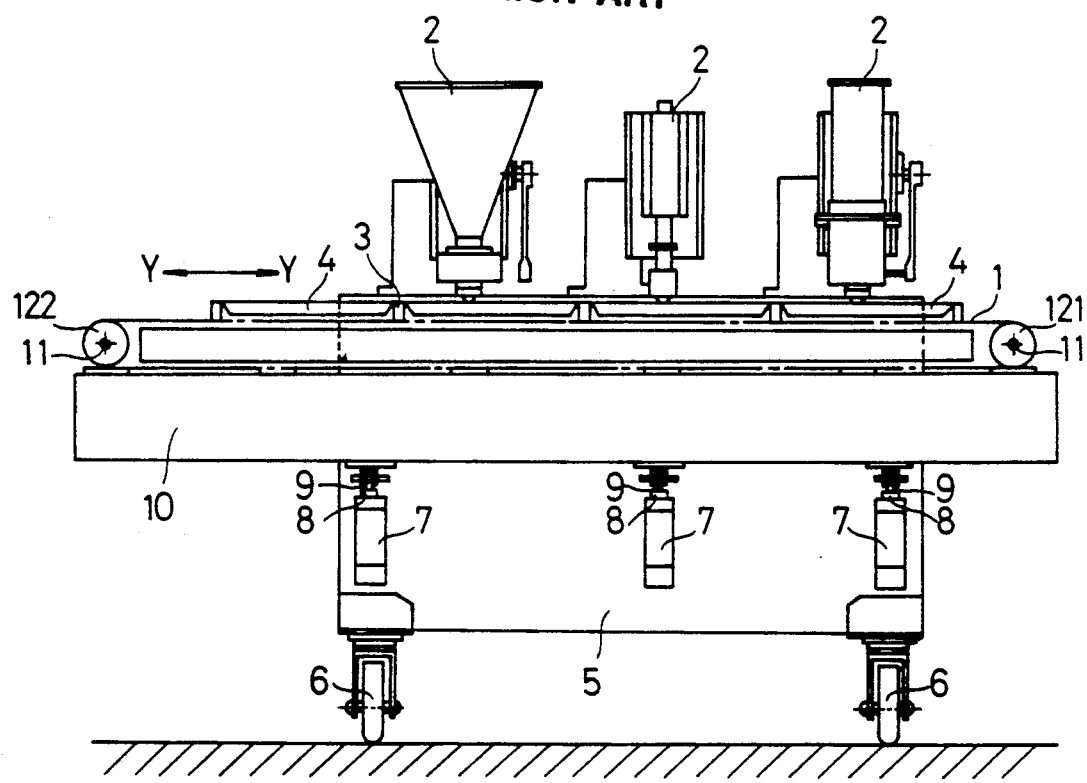
Figure 2:
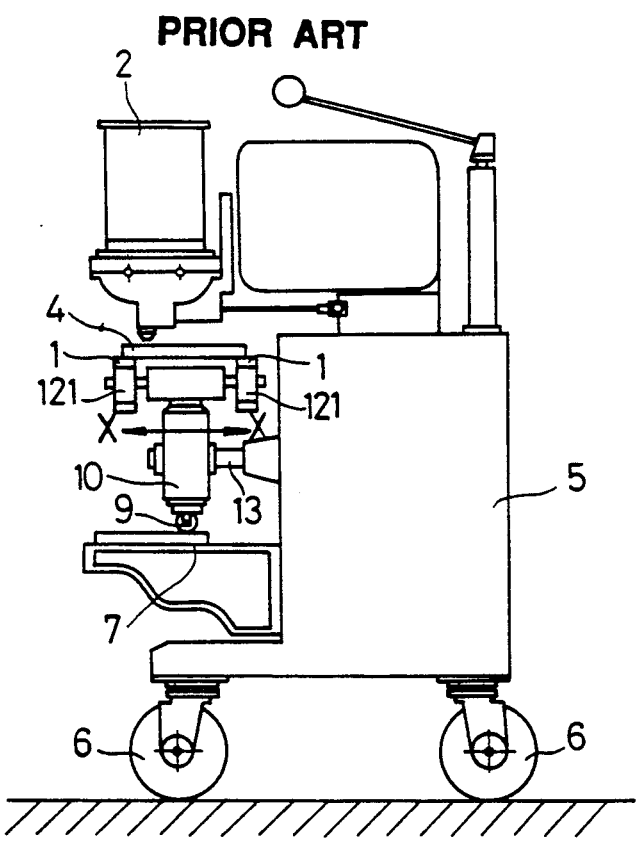
FIG. 2 is a right side view of the prior art apparatus shown in FIG. 1.
Figure 3:
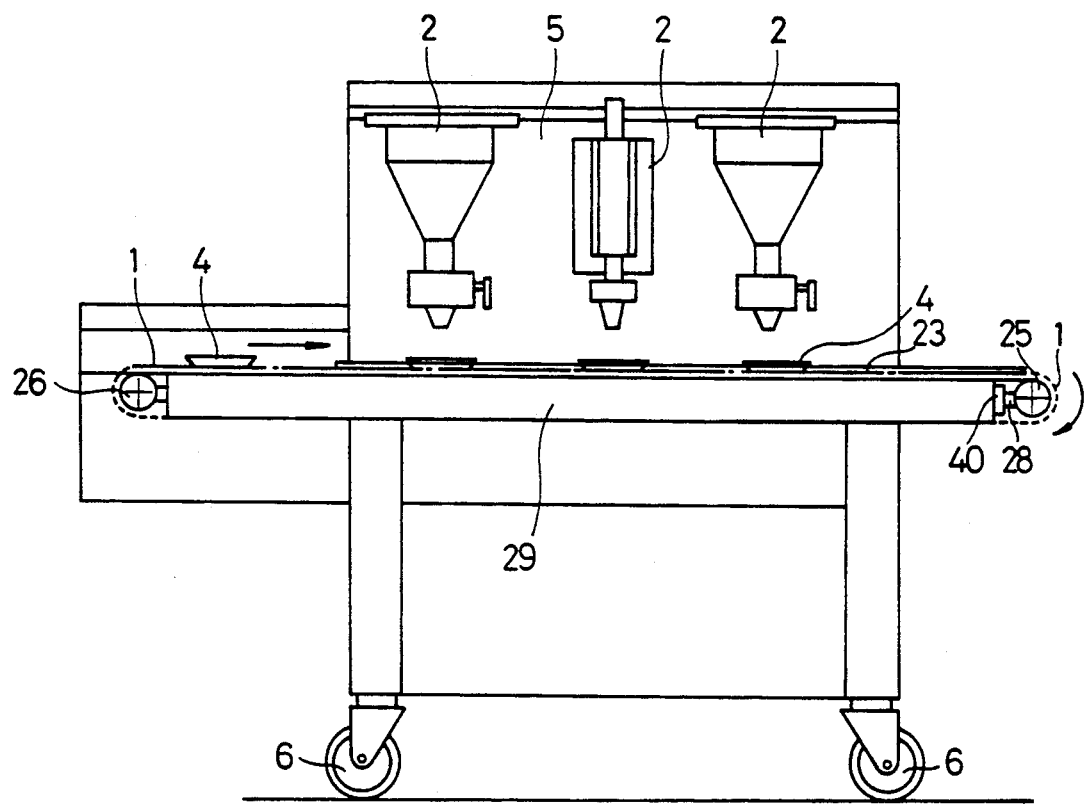
FIG. 3 is a front view showing an embodiment of the apparatus for automatically producing confectionery cakes or the like according to the invention.

Referring now to FIG. 3, like the prior art apparatus of automatically producing confectionery cakes or the like shown in FIGS. 1 and 2, stations 2 for processing, such as depositers and presses, are detachably mounted on the front of body 5. These stations can be selected according to cakes to be produced. Like the prior art apparatus shown in FIGS. 1 and 2, body 5 has casters 6 and capable is of movement. In the case of FIG. 3, three stations 2 are provided side by side. Opposite end stations 2 are depositers for dropping stuff of filling of cake, and middle station 2 is a press. Although, the case of FIG. 3 has three stations, one or more stations may be provided as desired. Where two depositers and a press are provided as stations 2 as the case of FIG. 3, it is possible to deposit stuff pieces or sheets 20 of cakes on upper plates 4 at predetermined positions thereof in the first station 2, then press such stuff sheets 20 to a vessel-like shape with the press as middle station 2 and deposit cream or other filling 21 in the depositer as the last station 2.

Figure 4:
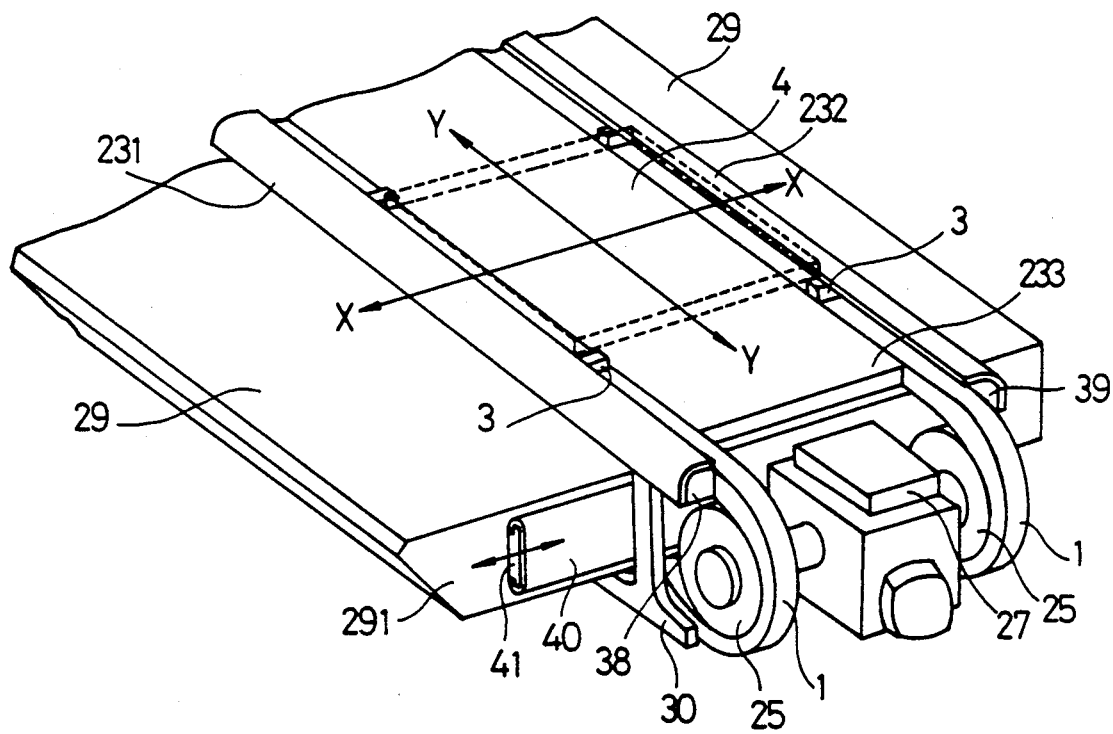
FIG. 4 is a fragmentary perspective view showing an outlet side portion of the apparatus shown in FIG. 3, from which confectionery cakes or the like automatically produced are discharged.
Figure 5:
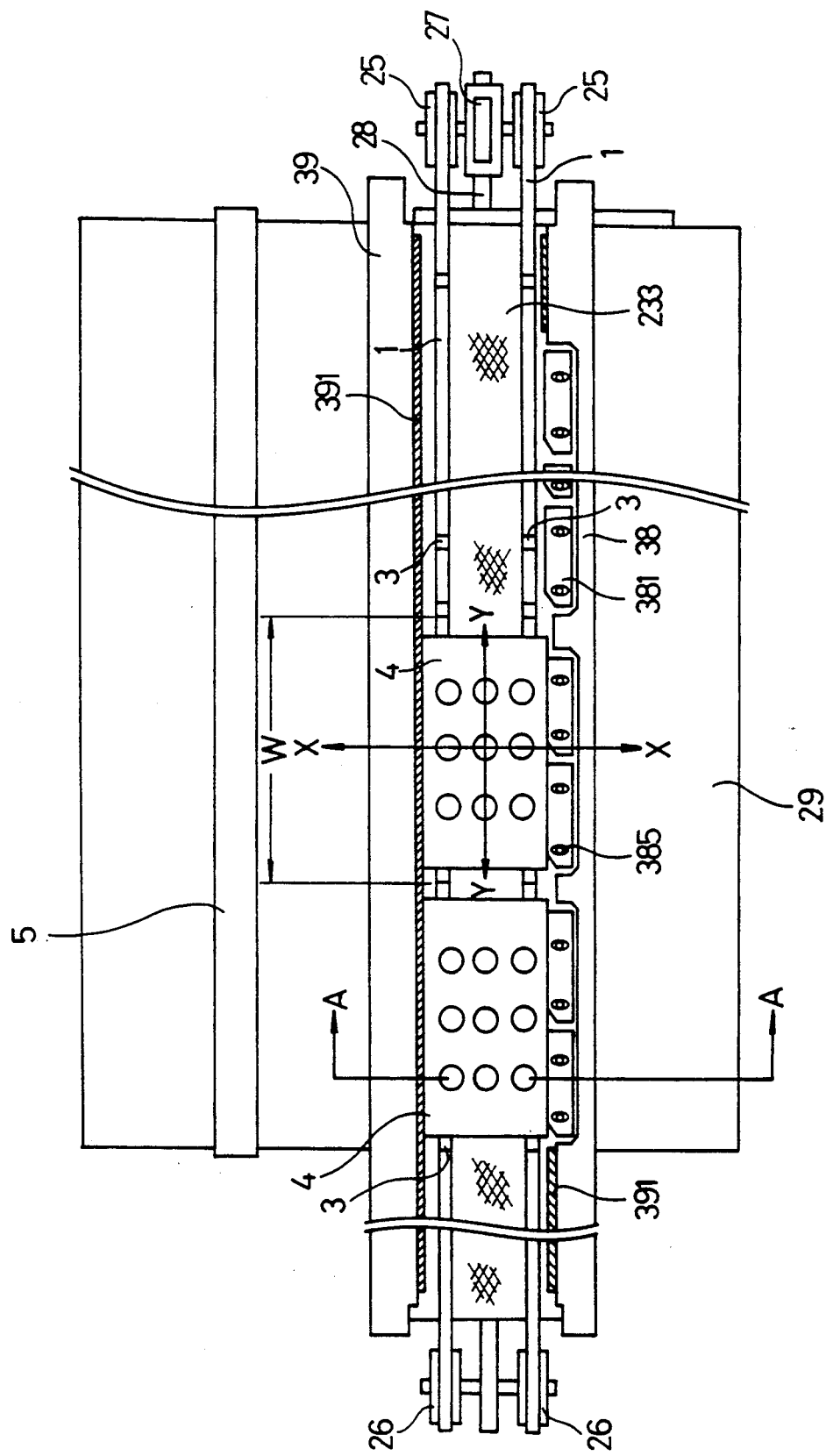
FIG. 5 is a plan view showing the apparatus shown in FIG. 3.

Beneath the row of stations 2 which are detachably provided, a pair of parallel endless conveyor belts 1 are disposed as shown in FIGS. 3 to 5. Conveyor belts 1 are run in the direction of the arrow in FIG. 3 and the Y—Y direction in FIGS. 4 and 5 to feed upper plates 4 forwardly. Each forwardly fed upper plate 4 is stopped at each of the stations in the row. In station 2, upper plate 4 (which is shown particularly by dashed line in FIG. 4) is displaced in the lensthwise direction, i.e., Y—Y direction as shown in FIGS. 4 and 5 and also in the widthwise direction, i.e., X—X direction in FIGS. 4 and 5, perpendicular to Y—Y direction at a unit pitch to be described later. With this displacement, a predetermined processing is given to eventual cakes right beneath the station. When the processing of eventual cakes on upper plate 4 is completed, upper plate 4 is fed to next station 2.

Figure 6:
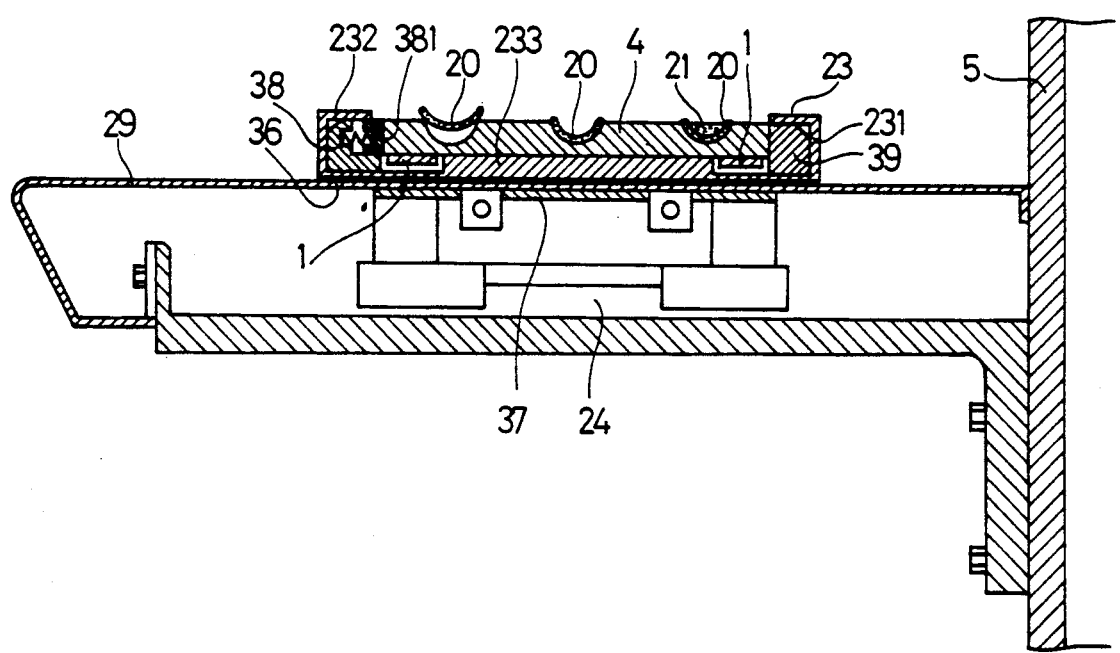
FIG. 6 is a sectional view, to an enlarged scale, taken along line A—A in FIG. 5.
Figure 14:
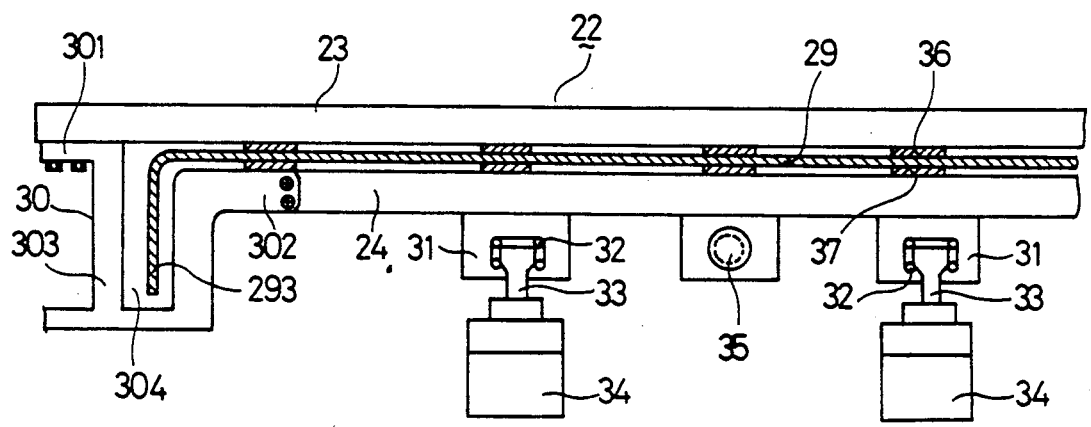
FIG. 14 is a view showing the coupling of upper and lower frames to each other.

For feeding upper plates 4 forwardly and also attaining unit pitch displacement thereof in the Y—Y and X—X directions under stations 2, movable frame 22 is provided beneath stations 2. As shown in FIGS. 6 and 14, movable frame 22 consists of upper and lower frames 23 and 24. Lower frame 24 rotatably supports, suitably at its opposite ends, drive and guide pulleys 25 and 26, and endless conveyor belts 1 are passed round these drive and guide pulleys 25 and 26. Drive pulleys 25 are driven from drive motor 27. To this end, motor 27 is secured by rod 28 to an end surface of lower frame 24 (see FIG. 5). More specifically, drive motor 27 and drive and guide pulleys 25 and 26 are mounted on movable frame 22, particularly at the opposite ends of lower frame 24, and conveyor belts 1 are passed around drive and guide pulleys 25 and 26. Thus, above upper frame 23 conveyor belts 1 are caused to undergo unit pitch displacement in the lengthwise direction, i.e., Y—Y direction, by drive motor 27 under each station 2. After completion of this unit pitch displacement, upper plates 4 are fed in the Y—Y direction, i.e., forwardly, by a distance W (see FIG. 5) to a position under next station 2. Where two different movements in the Y—Y directions are caused as in this case, suitably continuous teeth are provided at a fixed interval on the back side of conveyor belts 1 and also like teeth on the surfaces of drive and guide pulleys 25 and 26, these teeth being meshed with one another to permit rotational motion of drive pulleys 25 to be transmitted accurately to conveyor belts 1. In addition, suitably the number of rotations of drive pulleys 25 caused by drive motor 27 is matched to the pitch of intermittent movement of conveyor belts 1 (for instance, center-to-center distance between adjacent holders 3 shown in FIG. 5). For instance, drive pulleys 25 are rotated a number of rotations equal to an integral multiple of 1 or 2 by drive motor 27 so that conveyor belts 1 are moved by unit distance W with the integral multiple number of rotations of drive pulleys 25. In this arrangement, each upper plate 4 may be fed to a position beneath next station 2 with one rotation of drive pulleys 25. Further, it is possible to permit detection of the number of rotations of drive pulleys 25 with a gear or a detecting piece and detection of the position of such detecting piece with an approach switch. Such arrangement permits accurate control of the number of rotations of drive pulleys 25 and displacement of conveyor belts 1 in the Y—Y directions. More specifically, when causing pitch displacement of each upper plate 4 in the Y—Y direction under each station, an approach switch is adapted to on-off control drive motor 27 for control of the relative positions of the detecting piece and approach switch. With such an arrangement, drive motor 27 is not rotated intermittently but also at subdivided intervals provided by the approach switch. This subdivided interval rotation causes pitch displacement of upper plate 4 in Y—Y direction. By using a reversible motor as drive motor 27 upper plate 4 can undergo reciprocal pitch displacement.

Instead of a provision with a detecting piece or the gear, as described above, drive pulleys 25 are connected to a sub-motor via a reduction equipment, thereby obtaining a precise plus mathematic control so as to drive pulley 25 rotation or conveyer belts 1 displacement in the Y—Y direction.

As noted above, movable frame 22 supports drive motor 27 and drive and guide pulleys 25 and 26 and moves conveyor belts 1 between drive and guide pulleys 25 and 26 in the Y—Y directions. Cover 29 interposed between upper and lower frames 23 and 24 of movable frame 22 surrounds lower frame 24. The forward run of the pair of conveyor belts 1 is exposed above cover 29 via upper frame 23, while the return run is surrounded by cover 29. Cover 29 is removably mounted on the front of body 5.

Cover 29 perfectly surrounds lower frame 24 and the return run of conveyor belts 1 extending in a lower portion of lower frame 24. The forward run of conveyor belts 1 is forwardly moved intermittently by unit distance W in a state supported by upper frame 23. More specifically, the return run of conveyor belts 1 is supported by upper frame 23. Upper frame 23 is slidable over cover 29, and the return run of conveyor belts 1, proceeding from drive pulleys 25 at the end of the forward run, returns to guide pulleys 26 under lower frame 24 surrounded by cover 29. Upper frame 23, as shown in FIG. 6, has a pair of side frames 231 and 232 and a bottom plate 233 connecting these side frames. Conveyor belts 1 are supported on the back side bottom plate 233.

Upper and lower frames 23 and 24 of movable frame 22, are coupled together at one end, particularly the forward end, and extend as movable frame 22 in the X—X direction so that cover 29 may be interposed between them. They may be coupled together by any suitable coupling means. In FIG. 14, L-shaped member 30 is shown as coupling member. It has opposite flange portions 301 and 302, web portion 303 and insertion groove 304. Where upper and lower frames 23 and 24 are coupled together with lower frame 24 surrounded by cover 29, flange portion 301 of L-shaped member 30 and the associated end of upper frame 23 are coupled together by means of bolts. Depending end portion 293 of cover 29 is inserted in insertion groove 304, and end of lower frame 24 and other flange portion 302 are coupled together by means of bolts. Where the upper and lower frames are coupled together in this way, even the end surface of lower frame 24 is perfectly covered by cover 29, and upper and lower frames 23 and 24, drive and guide pulleys 25 and 26 and conveyor belts 1 can be moved in unison with one another in the X—X directions.

Displacement of movable frame 22 consisting of upper and lower frames 23 and 24 may be caused by any suitable mechanism. For example, a plurality of guide members 31 extending in the longitudinal direction are provided on the underside of lower frame 24, and guide tracks 33 are coupled to guide members 31 via linear ball bearings 32. Guide tracks 33 are mounted on bases 34 which are supported on body 5. Further, a substantially central portion of the underside of lower frame 24 is coupled to the mechanism for causing displacement in the widthwise direction, i.e., X—X direction. This mechanism uses ball a screw mechanism 35 which is driven from a motor (not shown) provided in body 5.

By driving this motor, movable frame 22 is displaced in the X—X direction via ball screw mechanism 35.

Further, as shown in FIGS. 6 and 14, suitably slide plate 36 is interposed between upper frame 23 supporting conveyor belts 1 and cover 29, and also slidable plate 37 is interposed between lower frame 24 and cover 29. These slidable plates 36 and 37 are made of a synthetic resin having excellent lubrication property. With the provision of these slidable plates upper and lower frames 23 and 24 slide smoothly in contact with the front and back surfaces of cover 29. With this sliding, conveyor belts 1 and movable frame 22 can both be moved smoothly in the X—X directions.

Figure 7:
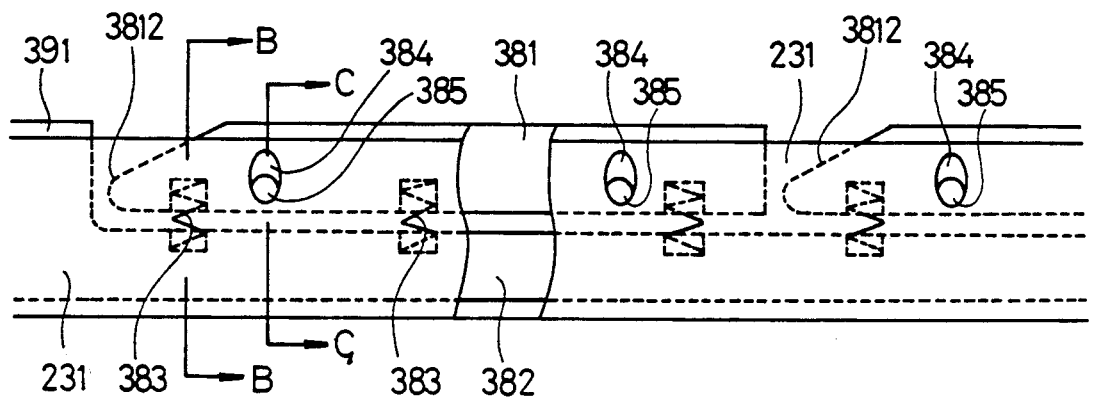
FIG. 7 is a plan view, to an enlarged scale and partly broken apart, showing the apparatus shown in FIG. 5, particularly an example of elastic guide member.
Figure 8:
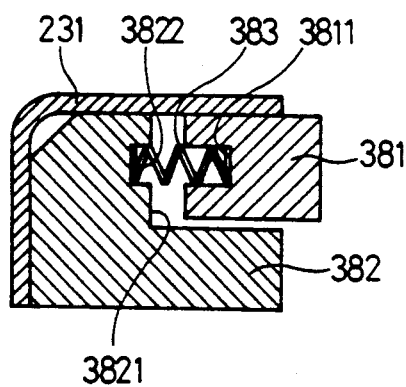
FIG. 8 is a fragmentary sectional view taken along line B—B in FIG. 7.
Figure 9:
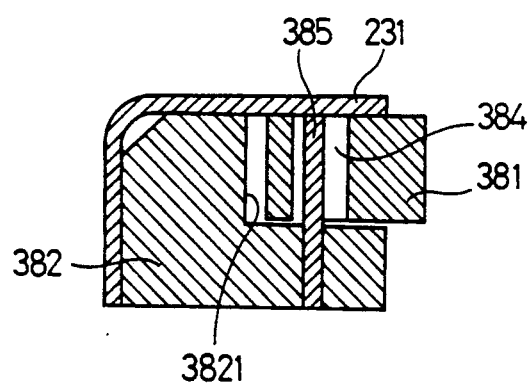
FIG. 9 is a fragmentary sectional view taken along line C—C in FIG. 7.
Figure 10:
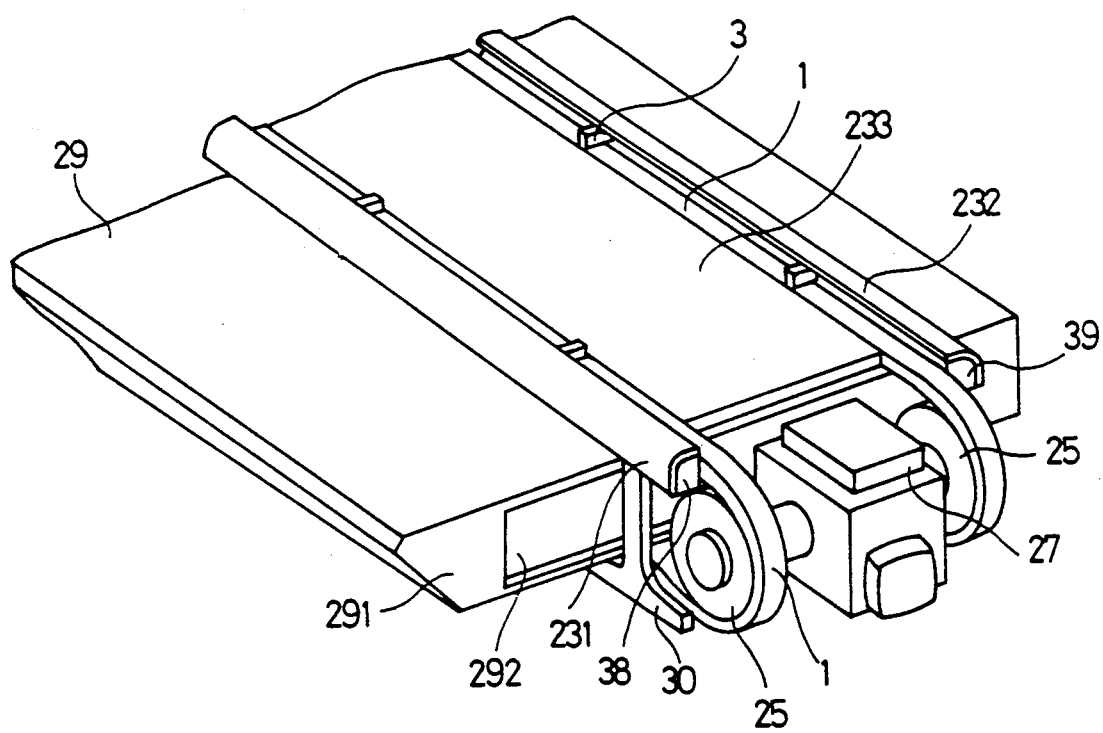
FIG. 10 is a fragmentary perspective view showing the apparatus shown in FIG. 3, particularly an opening formed at the end of each cover.

Further, with upper frame 23 consisting of a pair of side frames 231 and 232 and bottom plate 233, as shown mainly in FIGS. 5 and 6, elastic and stationary guide members 38 and 39 are mounted in a matched relation to each other on side frames 231 and 232. Each upper plate 4 held on the pair of conveyor belts 1 are clamped elastically and reliably between these two guide members 38 and 39. Elastic guide member 38 is provided on the outer side of one pair of conveyor belts 1, and it is capable of elastic elongation and contraction in the X—X directions. Stationary guide member 39 is provided on the outer side of other conveyor belt 1, and it has a rod-like shape. Elastic guide member 38 may have any structure so long as it can be elastically elongated and contracted in the X—X directions. As a suitable example of an elastic guide member, a plurality of guide pieces 381 are arranged in a straight row as shown in FIG. 5. More specifically, a plurality of guide pieces 381 constituting elastic guide member 38 are arranged along a straight line. As shown in FIG. 7, these guide pieces 381 are elastically mounted on a common holding member 382. Holding member 382 and guide pieces 381 constitute elastic guide member 38, which is mounted in a cover portion of side frame 231. Where each guide piece 381 is elastically mounted on holding member 382, rubber or other elastic material may be provided between guide piece 381 and holding member 382. As shown in FIGS. 7 and 8, at least two elastic springs 383 are provided at respective positions. As shown in FIGS. 7 and 9, each guide piece 381 is formed between portions where elastic springs 383 are mounted with slot 384, and pin 385 inserted therethrough. More specifically, as shown in FIGS. 5 and 7, holding member 382 has a rod-like shape, and the inner surface of this rod-like member, particularly a portion extending to a position underneath each station (see FIG. 1) is notched to form a notched portion. A plurality of guide pieces 381 are arranged in a straight line, and slidable plates 386 and 387 are provided in portions where guide pieces 381 are not provided, i.e., inlet and outlet on the inner side of holding member 382. Further, where guide pieces 381 are supported on holding member 382, holding member 382 is formed with shoulder 3821, as shown in FIG. 8, and each guide pieces 381 is seated on shoulder 3821, while elastic spring 383 is accommodated in holes 3822 and 3811 formed in holding member 382 and guide piece 381. Each guide piece 381 is formed with at least two slots 384, and pin 385 is inserted through each slot 384. Each pin 385 is secured between holding member 382 and a cover portion of side frame 231. Each guide piece 381 has its inner surface formed with inclined surface 3812 on the inlet side. With this arrangement, upper plate 4 can readily reach guide piece 381 along inclined surface 3812. When forwardly fed upper plate 4 reaches a position underneath each station 2, it enters the gap between and is clamped between elastic and stationary guide members 38 and 39. At this time, upper plate 4 enters smoothly along inclined surface 3812 of each guide piece 381 of elastic guide member 38 to be elastically clamped between guide piece 38 and stationary guide member 39. When upper plate 4 undergoes pitch displacement together with lower frame 24 in the X—X direction under each station 2 or undergoes pitch displacement in the Y—Y direction in a timed relation to pitch movement of conveyor belts 1 in the Y—Y direction, it and eventual cakes held thereon are never deviated. Thus, pitch displacement can be caused accurately according to a predetermined program to perform a predetermined step smoothly in co-operation with upper station 2. Further, slidable plate 391 may be provided on the inner side of stationary guide member 39 or holding member 382 to permit smooth movement of upper plate 14 in the Y—Y directions by holders 3.

Where upper frame 23 consists of pair side frames 231 and 232 and bottom plate 233 and lower frame 24 coupled via L-shaped coupling member 30 to upper frame 23 is surrounded by cover 29, it is necessary to form end surface 291 of cover 29 opening 292 for drive motor 27 and drive pulleys 25 are coupled via rod 28 to the end surface of lower frame 24. More specifically, while cover 29 is secured to body 5, lower frame 24 undergoes pitch displacement in the X—X directions for a distance, which covers at least the width dimension of upper plate 4. Therefore, opening 292 is formed such as to have a length corresponding to this distance. For this reason, opening 292 formed in cover 29 is very large. However, if drive motor 27 coupled by rod 28 to the end surface of lower frame 24 and drive pulleys 25 driven by drive motor 27 project from opening 292 to the outside, it is liable that an operator's hand is clamped in the projecting parts or opening 292 or that cake stuff falls onto the projecting parts. Cover 29 cannot sufficiently cover these projecting parts, and sufficient safety cannot be obtained.

Figure 11:
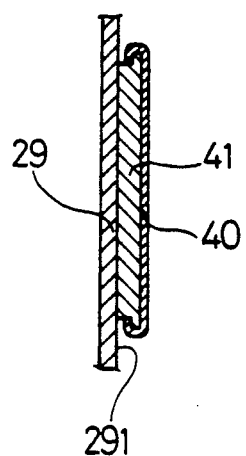
FIG. 11 is a sectional view showing an example of movable plate in the apparatus shown in FIG. 3.
Figure 12:
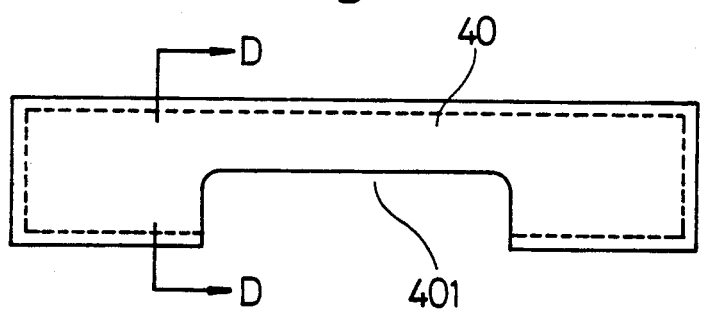
FIG. 12 is a front view showing the movable plate shown in FIG. 11.
Figure 13:
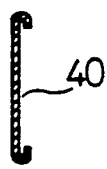
FIG. 13 is a sectional view taken along line D—D in FIG. 12.

Accordingly, slidable plate 40 is provided to close opening 292 of cover 29. Slidable plate 40 does not merely close opening 292 but slides together with drive motor 27 and drive pulleys 25 in closing opening 292. More particularly, end surface 291 of cover 29 corresponding to the opening is provided with guide 41 as shown in FIGS. 4 and 11. Slidable plate 40 is engaged with guide 41 so that it can be moved therealong. Slidable plate 40, as shown in FIGS. 12 and 13, has notch 401 formed substantially in its central portion corresponding to a projecting portion of drive motor 27, for instance, the cross section of rod 28, and rod 28 is inserted in notch 401. With this construction, drive motor 27 and drive pulleys 25 are moved together with lower frame 24 in the X—X directions. With this movement in the X—X directions, slidable plate 40 is moved along guide 41 in the X—X directions when the rod 28 engages the slidable plate 40 as it moves within the notch 401. Thus, lower frame 24 and accessory components thereto are all perfectly covered despite the fact that the considerably large opening 292 is formed in end surface 291 of cover 29. While drive motor 27 and drive pulleys 25 project from slidable plate 40 to the outside, there is no substantial possibility of clamping of an operator's hand in these portions. Further, when the drive motor and drive pulleys are to be covered, a cover (not shown), which can cover these parts and has a length corresponding to the stroke in the width direction, may be provided to perfectly cover the parts.

A mode of use of the apparatus for automatically producing confectionery cakes or the like having the above construction will now be described.

Figure 15:
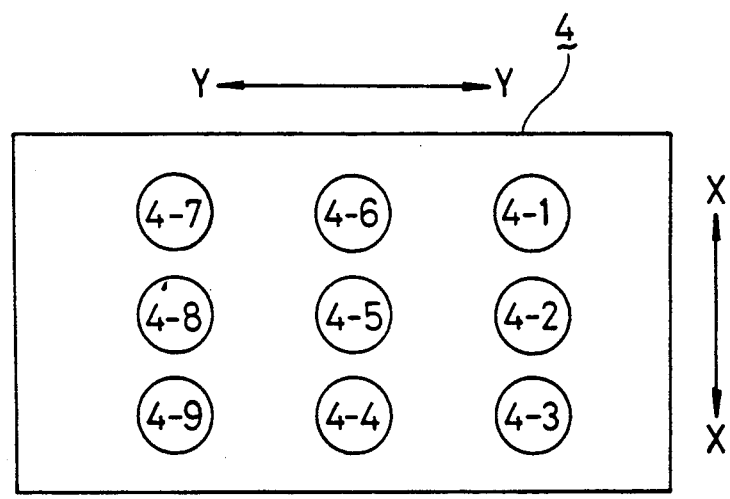
FIG. 15 is a view for explaining an example of a method of providing indices to positions of the upper plate, at which eventual cakes or the like are placed, in converting the displacement of each position to a pulse number when the upper plate is displaced in the X—X and Y—Y directions.

FIG. 15 shows upper plate 4. On upper plate 4, positions, at which eventual cakes are to be set, determined in advance as steps 4-1 to 4-9. While in the example of FIG. 15 nine steps are predetermined, it is possible to predetermine a desired number of steps. Eventual cakes to be processed are placed on upper plate 4 at positions corresponding to the respective steps, and upper plate 4 is then fed forwardly on pair conveyor belts 1 in the apparatus shown in FIG. 3. Underneath each station upper plate 4 is displaced in the X—X and Y—Y directions according to a predetermined program, thus performing a predetermined step of processing. When the step is completed, upper plate 4 is fed by unit distance W on the pair of conveyor belts 1 to a position underneath the next station 2. In this case, the displacement in the X—X and Y—Y directions in the individual steps of upper plate 4 are obtained as corresponding pulse numbers as shown in Table 1 and are stored in a computer. Further, adjustment is done such that a displacement of upper plate by, for instance, unit distance W, can be attained by an integral multiple of rotation of drive pulleys 25, for instance, one rotation or two rotations.

TABLE 1

| Step | Y—Y direction displacement (pulse number) | X—X direction displacement (pulse number) |
| --- | --- | --- |
| 4-1 | 0 | 0 |
| 4-2 | 0 | 5100 |
| 4-3 | 0 | 10200 |
| 4-4 | 8908 | — |
| 4-5 | — | 5100 |
| 4-6 | — | 0 |
| 4-7 | 17816 | — |
| 4-8 | — | 5100 |
| 4-9 | — | 10200 |

With the program as shown in Table 1 inputted to the computer, the processing is performed while upper plate 4 held on conveyor belts 1 is fed by driving drive pulleys 25.

For instance when step 4-1 on upper plate 4 is located underneath station 2, a Y—Y direction approach switch (not shown) is operated, and from this instant the program is started. Upper plate 4 is fed on conveyor belts 1 driven by drive pulleys 25 in the Y—Y directions. With respect to X—X directions, at the position of step 4-1 X—X direction approach switch (not shown) is actuated, and conveyor belts 11 and upper plate 4 are fed together with lower frame 24 in the X—X directions. In this way, the processing is completed for all the steps with pitch displacement underneath the first station 2. When the processing is completed, drive pulleys 25 are rotated an integral number of times, for instance, one rotation or two rotations. Upper plate 4 thus is fed to the position underneath the next station. Thus, like the previous moment the X—X and Y—Y direction approach switches are actuated to cause pitch displacement of upper plate 4 in the Y—Y and X—X directions according to a predetermined program. Thus, a predetermined step of processing in next station 2 is completed for all the steps, the approach switches are further actuated to feed the upper plate to the position underneath the third station for execution of a processing according to a predetermined program.

Where the displacements for the individual steps are determined as corresponding pulse numbers as shown in Table 1, when steps 4-7 to 4-9, for instance, are reached, steps 4-1 to 4-3 are not reached underneath next station 2 unless upper plate 4 is further moved in Y—Y directions. Accordingly, it is possible to arrange such that a return-to-orgin signal is produced with respect to Y—Y directions upon completion of the nine steps, the upper plates are displaced by predetermined distance W by drive pulleys 25, at which time the Y—Y direction approach switch is operated, thus causing the start of the next program.

What is claimed is:

1. An apparatus for automatically producing confectionery cakes, comprising at least one station for processing or shaping a plurality of cakes respectively placed on corresponding upper plates, drive and guide pulleys rotatably provided underneath said station or stations, a pair of parallel endless conveyor belts passed around said drive and guide pulleys, each of said conveyor belts having a forward run and a return run, and holders provided at a predetermined pitch on said conveyor belts for keeping the upper plates on said conveyor belts, said upper plates each being displaced in the lengthwise direction of said conveyor belts and widthwise direction perpendicular to said lengthwise direction for processing or shaping the cakes, in which said apparatus further comprises a lower frame rotatably carrying said drive and guide pulleys at opposite ends, and a cover covering said lower frame and having a top surface slidably supporting the forward run of said conveyor belts and covering the return run thereof.

2. The apparatus according to claim 1, wherein said lower frame is capable of being displaced in said widthwise direction via a ball screw mechanism.

3. The apparatus according to claim 1, wherein a slidable member of a synthetic resin is mounted between an upper frame and said cover.

4. An apparatus for automatically producing confectionery cakes, comprising at least one station for processing or shaping a plurality of cakes respectively placed on corresponding upper plates, drive and guide pulleys rotatably provided underneath said station or stations, a pair of parallel endless conveyor belts passed around said drive and guide pulleys, each of said conveyor belts having a forward run and a return run, and holders provided at a predetermined pitch on said conveyor belts for keeping the upper plates on said conveyor belts, said upper plates each being displaced in the lengthwise direction of said conveyor belts and widthwise direction perpendicular to said lengthwise direction for processing or shaping the cakes, in which said apparatus further comprises a lower frame rotatably carrying said drive and guide pulleys at opposite ends, a cover covering said lower frame and having a top surface slidably supporting the forward run of said conveyor belts and covering the return run thereof, and a widthwise direction displacing unit coupled directly to said lower frame for displacing said lower frame in the widthwise direction perpendicular to the lengthwise direction of said conveyor belts.

5. The apparatus according to claim 4, wherein said widthwise direction displacing unit includes a rod directly coupled to said lower frame and a ball screw mechanism connected to said rod, and said ball screw mechanism and said rod being accommodated in said cover.

6. An apparatus for automatically producing confectionery cakes, comprising at least one station for processing or shaping a plurality of cakes respectively placed on corresponding upper plates, drive and guide pulleys rotatably provided underneath said station or stations, a pair of parallel endless conveyor belts passed around said drive and guide pulleys, each of said conveyor belts having a forward run and a return run, and holders provided at a predetermined pitch on said conveyor belts for keeping the upper plates on said conveyor belts, said upper plates each being displaced in the lengthwise direction of said conveyor belts and widthwise direction perpendicular to said lengthwise direction for processing or shaping the cakes, in which said apparatus further comprises a lower frame rotatably carrying said drive and guide pulleys at opposite ends, a cover covering said lower frame and having a top surface slidably supporting the forward run of said conveyor belts and covering the return run thereof, and an upper frame slidably provided on top of said cover and having said upper frame and at least one end of said lower frame being coupled together by a coupling member so that said lower and upper frames can be displaced in unison with each other in the widthwise direction perpendicular to the lengthwise directon of said conveyor belts.

7. The apparatus according to claim 6, wherein said coupling member coupling together said upper frame and at least one end of said lower frame is an L-shaped member.

8. An apparatus for automatically producing confectionery cakes, comprising at least one station for processing or shaping a plurality of cakes respectively placed on corresponding upper plates, drive and guide pulleys rotatably provided underneath said station or stations, a pair of parallel endless conveyor belts passed around said drive and guide pulleys, each of said conveyor belts having a forward run and a return run, and holders provided at a predetermined pitch on said conveyor belts for keeping the upper plates on said conveyor belts, said upper plates each being displaced in the lengthwise direction of said conveyor belts and widthwise direction perpendicular to said lengthwise direction for processing or shaping the cakes, in which said apparatus further comprises a lower frame rotatably carrying said drive and guide pulleys at opposite ends, a cover covering said lower frame and having a top surface slidably supporting the forward run of said conveyor belts and covering the return run thereof, an elastic guide member provided on the outer side of one of said conveyor belts and capable of being elastically elongated and contracted in the widthwise direction perpendicular to the lengthwise direction of said conveyor belts, and a guide member provided on the outer side of the other one of said pair of conveyor belts, each said upper plate being held by said elastic and stationary guide members.

9. The apparatus according to claim 8, wherein said stationary guide member consists of a continuous common rod-like member provided with a plurality of guide pieces and a holding member extending parallel to said stationary guide member and elastically supporting said guide pieces for elongation and contraction.

10. The apparatus according to claim 8, wherein each said guide piece has an inclined surface provided on the inner surface on the inlet side thereof.

11. The apparatus according to claim 8, wherein said elastic and stationary guide members are made of a synthetic resin.

12. An apparatus for automatically producing confectionery cakes, comprising at least one station for processing or shaping a plurality of cakes respectively placed on corresponding upper plates, drive and guide pulleys rotatably provided underneath said station or stations, a pair of parallel endless conveyor belts passed around said drive and guide pulleys, each of said conveyor belts having a forward run and a return run, and holders provided at a predetermined pitch on said conveyor belts for keeping the upper plates on said conveyor belts, said upper plates each being displaced in the lengthwise direction of said conveyor belts and widthwise direction perpendicular to said lengthwise direction for processing or shaping the cakes, in which said apparatus further comprises a lower frame rotatably carrying said drive and guide pulleys at opposite ends, a cover covering said lower frame and having a top surface slidably supporting the forward run of said conveyor belts and covering the return run thereof, said cover having one end surface formed with an opening corresponding to the orbit of movement of said lower frame, a drive motor provided on one end surface of said lower frame for driving said drive pulleys, said drive motor projecting from said opening to the outside, said opening of said cover being closed by a movable plate capable of being moved with said drive motor.

13. The apparatus according to claim 12, wherein said drive motor is coupled to a front end of a rod with a rear end thereof secured to one end surface of said lower frame, said movable plate being formed with a hole matched to said rod, said rod penentrating said hole, and said movable plate is capable of being moved with said rod.

* * * * *